Patented Nov. 23, 1937

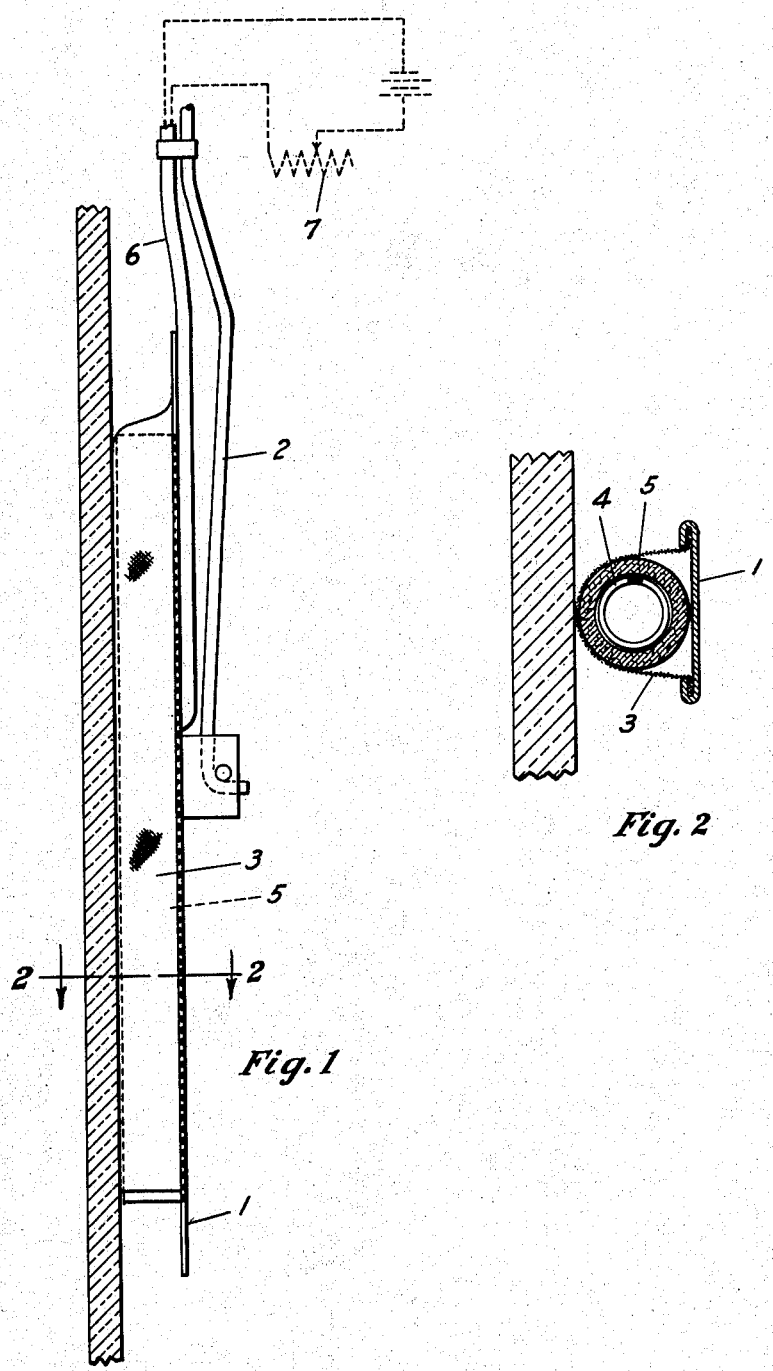

2,100,019

UNITED STATES PATENT OFFICE 2,100,019

WINDSHIELD DEFROSTER BLADE

Arlis Rolland Wilson, Chicago, Ill.

Application August 17, 1936, Serial No. 96,359½

3 Claims. (Cl. 219—19)

The invention to be hereinafter described relates to windshield defroster blades.

There are a great variety of windshield wipers of the oscillating blade type and a considerable number of these have been provided with heating elements in one manner or another. Most of them have a rubber edge or surface arranged to engage and wipe the glass. A defect in such arrangements is the effect of heat on rubber. The rubber hardens and becomes short-lived. In its hardened state it is less effective. A very serious objection is that the rubber is an effective heat insulator. Consequently, rubber prevents or seriously retards and lessens accomplishment of the main aim of such devices. It greatly retards or even prevents flow of heat from the heating element to the glass surface.

The main objects of the present invention are to provide a simple, efficient, compact and inexpensive defroster blade avoiding the above and other defects, and with which is associated a simple, efficient, compact temperature control means, preventing overheating while, nevertheless, permitting considerable range of varying temperatures.

An important object is the use of readily obtainable materials of high efficiency and low cost and, of a nature readily available throughout the entire country.

In order to more clearly disclose the construction, operation and use of the invention, reference should be had to the accompanying drawing forming part of this application.

Throughout the several figures of the drawing, like reference characters designate the same parts in the different views.

In the drawing:

Fig. 1 is a side elevation of the invention applied, the windshield glass being shown in vertical cross section, and Fig. 2 is an enlarged lateral cross section on line 2—2 of Fig. 1, looking in the direction of the arrows.

Throughout this application, the term blade is used, broadly and in the sense generally accepted and understood as applied to windshield wipers—i. e. the movable arm which reciprocates across the windshield and, by contact therewith, removes accumulating moisture, snow, sleet, etc. It is often referred to as the windshield wiper blade.

Referring to the drawing in detail 1 indicates a flat metal plate provided with a small bracket or the like for removably connecting it, in well known manner to the free end of the usual oscillating member 2. This plate provides a suitable backing or base to which is secured in any suitable manner a fabric tube 3, preferably of strong, wear resistant canvas. This forms an open-ended pocket or retainer. Or the lower end may be closed, if desired. Both ends may be closed, if, preferably, one may be readily opened. This sheath, tube or pocket may be cemented or otherwise secured, in any one of a number of well known ways, to the plate 1. It is designed and intended to contact and wipe the windshield and to enclose and contain a heater. It must, therefore, be wear resistant and a fairly good heat conductor. It should, also not deteriorate, appreciably, under the heat to which it will be subjected. It may be treated, if desired, to render it appreciably fire resistant. It may be treated, too, to render it substantially waterproof. A good grade of canvas has been found very satisfactory. Within this tube or pocket is slipped an enclosed heating element 4 which, in turn, is enclosed in the usual fibre or other tube 5. Thus, the heater is in direct contact with the canvas and with the metal back plate. The heating element, per se, is well known. It is such as are used in various types of lighters, etc., and, therefore, needs no further description or illustration. Its terminals may be at, and lead out through, the center, or at either end, or arranged in any other manner desired. In the instance shown, they are at the center and are, there, connected to the usual circuit wires 6 which are led in through an opening in plate 1. These wires, of course, include the usual battery and, for varying the temperature of the device, a variable resistance device which may take the form of a rheostat 7. By operating the control of the rheostat, or its switch or handle, the user may increase or decrease the temperature at will, according to conditions. In this way, excessive and damaging heat, under mild conditions, is avoidable, while ample heat is available for severe conditions, as will be clearly understood.

There is no heat insulation between the heater element and the windshield, nor between the heater element and the parts of the defroster blade. The metal plate at the back, acts as a radiator to reflect heat toward the windshield and to confine it, to a certain extent, between the windshield and plate 1. Any freezing between glass and wiper blade is practically impossible. It is equally impossible for the blade to become coated, clogged or encased with snow, ice, etc. Every part of its surface is maintained at such a temperature that it is always clear. If the conditions become so severe as to show slowing in the melting of the snow, etc., it is only necessary to increase the temperature a little.

It is thought that the construction, operation and use of the invention will be clear from the preceding detailed description.

Many changes may be made in the construction, arrangement and disposition of the various parts of the invention, within the scope of the appended claims, without in any degree departing from the field of the invention and it is meant to include all such within this application, wherein only one preferred form has been illustrated, purely by way of example and with no thought of in any degree limiting the claims thereby.

Having thus described my invention, what I claim and desire to protect by Letters Patent is:—

1. A windshield defroster blade comprising a heat reflecting plate adapted to be connected to the movable element of a windshield wiper, a fabric pocket carried by said plate and extending therefrom into windshield wiping position, and a heating element removably disposed within said pocket and in contact with said plate and said pocket.

2. A windshield defroster blade comprising a heat reflecting plate adapted to be connected to the movable element of a windshield wiper, a fabric strip secured to opposite edges of said plate for substantially the full length thereof and extending outwardly therefrom forming a pocket the full length of said plate having a metal heat reflecting wall and an opposite fabric windshield wiping wall, and a heating element removably seated in said pocket in contact with said plate and said fabric, the heat of said element being applied both directly by contact to said fabric and indirectly by reflection by said plate to said fabric.

3. A windshield defroster blade comprising a heat reflecting plate adapted to be connected to the movable element of a windshield wiper, a fabric strip secured to opposite edges of said plate for substantially full length thereof by folding over the edges of said plate and clamping the fabric between said folds and plate, said fabric strip extending outwardly from said plate and forming a pocket the full length of said plate having a metal heat reflecting wall and an opposite fabric windshield wiping wall, and a heating element removably seated in said pocket in contact with said plate and said fabric and between the edges of said fabric, the heat of said element being applied both directly by contact to said fabric and indirectly by reflection by said plate.

ARLIS ROLLAND WILSON.